United States Patent Office 2,948,439
Patented Aug. 9, 1960

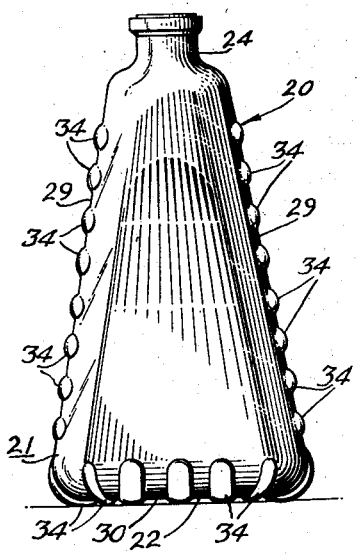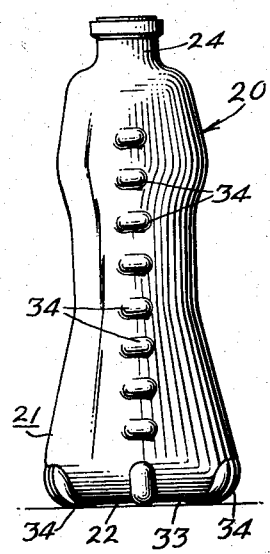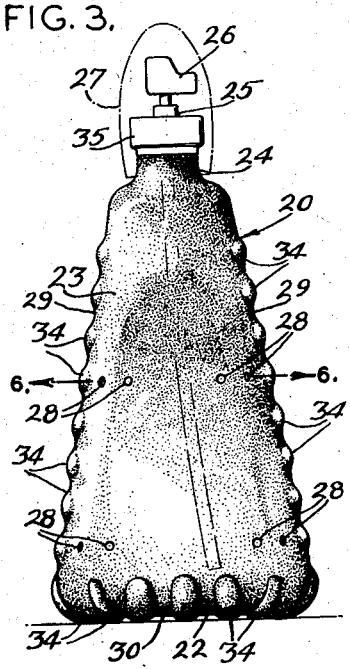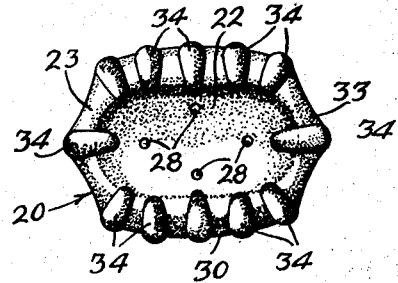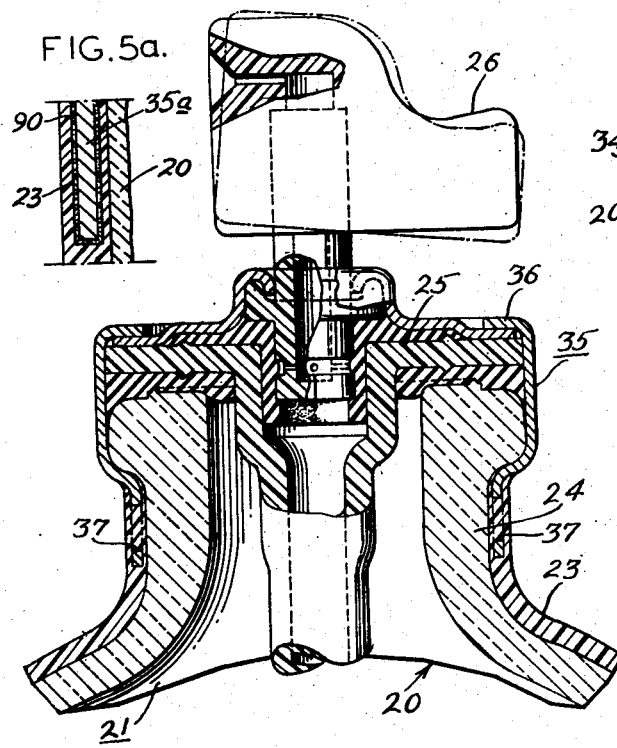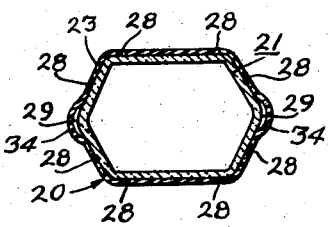

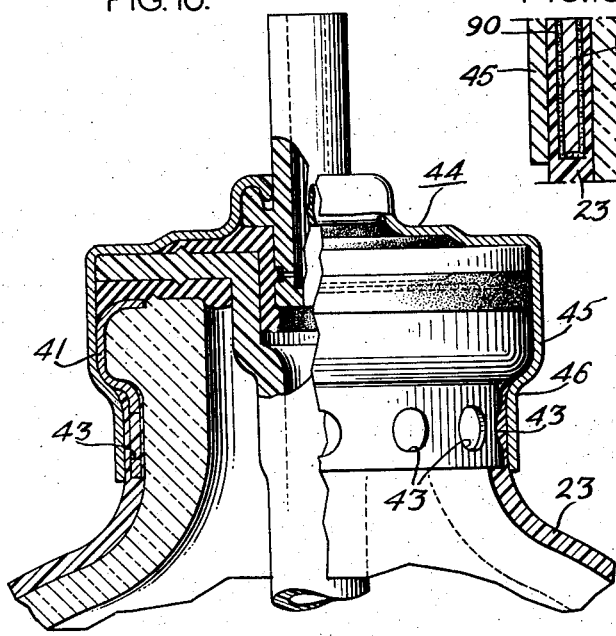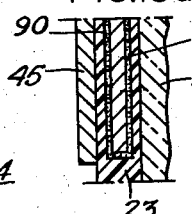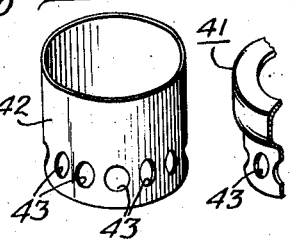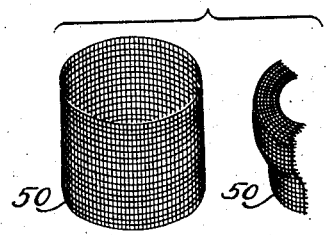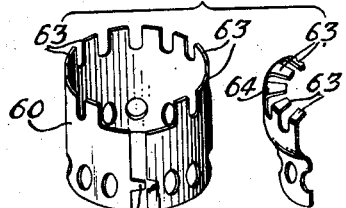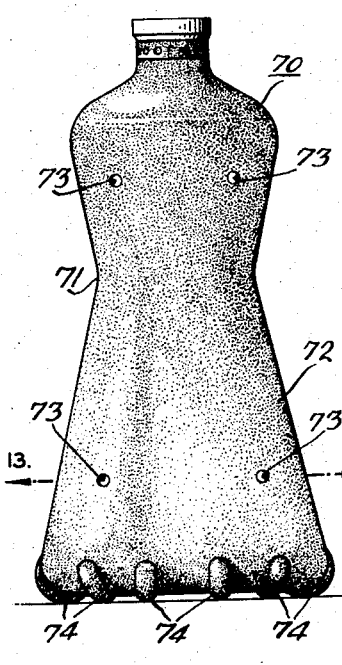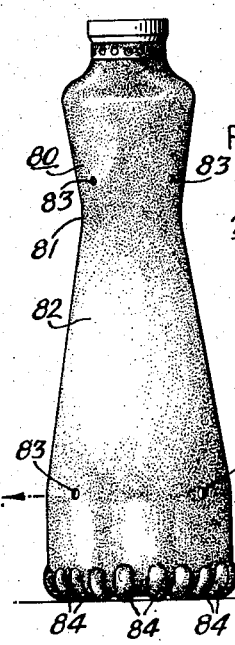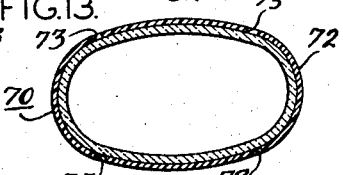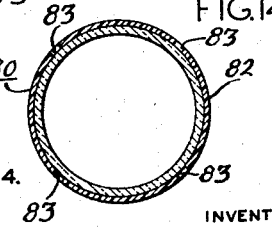

2,948,439

REINFORCED GLASS AEROSOL CONTAINERS AND METHOD OF MAKING SAME

William S. Glover, Vineland, and Joseph F. West, Millville, N.J., assignors to Wheaton Glass Company, Millville, N.J., a corporation of New Jersey Filed Nov. 16, 1956, Ser. No. 622,647

7 Claims. (Cl. 222—183)

This invention relates to the art of aerosol containers. In a number of regards it embodies the features and advantages of the copending application of Joseph F. West, Serial Number 486,565, filed February 7, 1955, now Patent Number 2,906,462, and provides improvements in detail over those features.

As pointed out in said West application, there are certain marked advantages in the use of glass in containers of this type, from which liquids are to be projected through dispensing valves under the pressure of a volatile propellant. These include better appearance and customer appeal and maintenance of both the product and container against deterioration. In spite of these obvious theoretical advantages, glass was previously not acceptable as a substitute for metal in containers of this type, because of the hazard of flying glass under the impelling force of the volatile propellant, in case of accidental breakage of the bottle.

The invention described and claimed in the aforesaid West application provided a commercially acceptable solution for this problem and made it possible to attain the obvious advantages of use of glass in these containers, while minimizing the flying glass hazard. The primary object of the present invention has been to reduce this hazard still further, by eliminating the chance of breakage of the bottle in such manner as to create this hazard, even in the unusual types of impact where there was a certain residual element of risk.

In extensive experimentation with aerosol bottles coated with perforated elastic sheathing as described in said prior application, it has been determined that when a bottle is dropped and broken in a manner to produce a flying glass hazard, this has frequently been the result of simultaneous impact against the floor or ground of elements of the bottle forming a continuous area or straight or curved line constituting a ridge of substantial extent. Where the bottle has one or more linear ridges, for example, a seam of substantial length may be opened up along the ridge to release flying glass if the bottle falls in such a manner as to cause simultaneous impact of a substantial length of the ridge with the floor or ground. An important object and feature of the invention has been to provide a bottle in which this danger is avoided.

Another situation in which a similar problem has been encountered has been that in which the bottle has been dropped bottom side up, with resulting breaking off of the neck and opening up of the crimped connection between the depending sleeve of the dispensing valve and the underlying upper end of the plastic sheathing, and a further object and feature has been to provide a bottle avoiding this danger.

In brief, the danger of opening up a seam in the plastic sheathing is avoided in practice of the present invention by providing a plurality of localized projections extending beyond the line of the critical ridge or area, and the danger from breaking the sealed connection at the neck of the bottle is avoided by providing a mechanical and/or adhesive bond between the upper end of the sheathing and the lower end of a ferrule or sleeve whose upper end is flanged inwardly over the outer edge of the top of the bottle, thus eliminating the chance of a separation of the plastic sheathing from the neck.

Still further objects and features of the invention will be evident from reading of the following detailed description in the light of the attached drawing, in which, Figure 1 is an elevational view of a glass bottle fabricated for use in practice of the invention, taken before this bottle is coated or the dispensing valve attached, Figure 2 is a side elevation of the bottle of Figure 1, Figure 3 is a view similar to Figure 1, showing the bottle after the coating or sheathing and the dispensing valve have been applied, Figure 4 is a bottom view of the bottle of Figure 3, Figure 5 is an enlarged transverse vertical cross section through the upper end of the bottle of Figure 3, Fig. 5a is an enlarged fragmentary sectional view of an alternative construction of the embodiment of Fig. 5, Figure 6 is a horizontal cross-section taken on the line 6—6 of Figure 3, Figure 7 is a perspective view of a ferrule or sleeve which may be used to reinforce the neck of the bottle and interconnect the sheathing irremovably with its upper end, Figures 8 and 9 are similar to Figure 7 but illustrate modifications of the ferrule or sleeve.

Figure 10 is a vertical cross-section of the upper end of the bottle, utilizing the connecting and reinforcing sleeve of Figure 7, Fig. 10a is an enlarged fragmentary sectional view of an alternative construction of an embodiment of Fig. 10, Figures 11 and 12 are front elevations, respectively, of two different forms of bottle to which the features of the invention have been applied, and Figures 13 and 14 are cross-sections on the lines 13—13 and 14—14 of Figures 11 and 12, respectively.

While the features which are unique to the present invention may be utilized in a variety of ways, their greatest usefulness is attained in conjunction with the primary features of the aforesaid West application. As there taught the glass bottle 20 is coated over its main body 21 including its bottom 22 with a plastic sheathing 23 (Figures 3, 5 and 6), and this sheathing extends upwardly and surrounds at its upper end the neck 24, where it is interconnected, through a fluid-tight connection, with the upper end of the dispensing valve 25, which may be provided with an actuating handle 26 and an ornamental cover 27, as familiar to users of aerosol containers.

The sheathing 23 is preferably elastically expansible and may be formed by dipping or spraying to apply a liquid resin precursor such as a polymerized vinyl chloride plastisol composition to the bottle exterior and thereafter curing the applied composition to provide a coating having the necessary tensile and tear strength to resist rupture. The resulting cured product does not adhere to the surface of the bottle and it will therefore become inflated by the directly applied pressure of the propellant gas upon breakage of the glass of the bottle which it envelops. Since it is desirable that the propellant gas be vented gradually from the elastic sheathing as thus inflated, a number of small perforations 28 are formed through the side and bottom wall surfaces of the elastic sheathing after it is formed.

Bottles having these features have become familiar articles of commerce through promotion of the invention of the aforesaid West invention, and the present invention involves a still further improvement. It has been determined experimentally that the sheathings surrounding the bottles prevent them from ejecting the glass upon breakage in most situations. This is especially true where the force of the impact does not cause a breakage of the plastic sheathing, but only shatters the surrounded glass. It is also true even in cases in which the sheathing is punctured, so long as the impact is such as to produce only a small puncture, as in the case where the impact is restricted to a single point or small area. However, there are usually certain lines or areas on the exterior surface of the bottle with considerable continuity in a single line or plane, and if the bottle falls with this line or plane downward and parallel to the surface of the floor or ground, this may result in producing a puncture or gash of substantial length or size at the locus of impact, with the result that glass will be projected through this opening before the vent holes can complete their function of venting the propellant vapor. The lines 29 and 30 of Figure 1 and the line 33 of Figure 2 would normally produce such a danger in the absence of the features characterizing the present invention, as they provide linearly projecting ridges of substantial length.

A primary feature of the present invention consists in the provision of a plurality of localized projections 34 on the exterior surface of the bottle so that they underlie the plastic sheathing or coating 23 after it is applied to the bottle. These projections are spaced over the critical lines or areas in such a way as to produce substantially point impact at their locations instead of line or area impact as might be the case if they were omitted. This result is obtained by reason of the fact that they extend outwardly beyond the lines of the ridges 29, 30 and 33, for example. If breakage of the plastic sheathing occurs by impact at these projections, this will be highly localized, and will therefore merely produce one or more small punctures, which will allow escape of propellant without flying glass.

In further experimentation with bottles of the prior West application, it has been found that danger from flying glass or other parts may occur by reason of a somewhat different type of impact, with the bottle in substantially upside down position, with the consequence that the neck is broken. This may release the crimped connection between the depending sleeve of the dispensing valve and the upper end of the plastic sheathing, with sudden release of volatile vapor and broken glass. In the practice of the present invention this is avoided by providing a strong mechanical and/or adhesive connection between the upper end of the sheathing and the upper end of the bottle. As illustrated in Figure 5, a metal sleeve or ferrule 35 surrounds the upper portion of the neck 24 of the bottle and is flanged inwardly at 36 to secure the dispensing valve structure 25 in place. The lower end of sleeve 35 is interlocked with the plastic sheathing 23 before flange 36 is formed; i.e., while this portion of the sleeve is an upward extension of its main body.

The lower end of sleeve 35 is perforated at a number of points around its circumference as indicated at 37. With the sleeve positioned as illustrated in Figure 5, except for formation of flange 36, the sheathing 23 may be formed by dipping the bottle in a plastisol composition so that the viscous resin precursor enters and fills the holes 37. When the curing operation is completed, the bottom and sides of the bottle will therefore be coated up to the region of the neck by an elastic sheathing and this sheathing will be mechanically interlocked at its upper end with the lower end of sleeve 35. The bottle may then be filled, the dispensing valve structure 25 applied and sleeve 35 flanged inwardly as illustrated at 36 to secure the assemblage together.

Instead of interlocking sheathing 23 with sleeve 35 mechanically through holes 37, these holes may be omitted and an adhesive bond employed. This may be attained by coating the lower end of sleeve 35a with an adhesive 90 (Fig. 5a) which serves as a coupling agent between the metal of the sleeve and the subsequently-applied sheathing 23. By first applying to the lower end of sleeve 35 a chlorinated rubber adhesive as at 90 and thereafter forming the sheathing 23 by dipping about the lower end of the sleeve so that it surrounds the main body of the bottle and extends into overlapping relation to opposite sides of the lower end of sleeve 35, the sheathing will become bonded to the sleeve when the curing has taken place. Regardless of whether the interlocking of sleeve 35 with sheathing 23 is attained mechanically or adhesively, the upper end of the bottle and dispensing valve will be interlocked upon subsequent formation of flange 36, so that glass cannot escape even though the neck of the bottle be badly broken.

Figure 10 illustrates a modification of the invention in which the sheathing is interlocked with the upper end of the bottle independently of the structure of valve. The interlocking sleeve 41 may be formed from a sheet metal cylinder 42 (see Fig. 7) by necking its lower end and flanging its upper end inwardly so as to secure it to the upper end of the bottle as illustrated in Figure 10, and the plastic sheathing 23 is then formed in interlocking relationship to the sleeve as in the embodiment of Figure 5, through holes 43 as illustrated, or by adhesive bonding 90 (Fig. 10a), or by both of these types of securement. After securement of sleeve or ferrule 41 to the bottle and plastic sheathing, the bottle may be filled and dispensing valve structure 44 applied, the depending sleeve or flange 45 of this structure being formed or inwardly spun as a last step in the assembly, as illustrated at 46 in Figure 10.

Figure 8 illustrates a modification involving the use of a sleeve 50 of wire mesh, in place of the sleeve 42 of Figure 7.

Figure 9 illustrates a still further modification, in which a longitudinally split sleeve 60 is substituted for the continuous sleeve 42 of Figure 7. The opposed ends of this sleeve carry a tongue 61 and a mating groove 62, respectively, to insure their alignment when released to surround the neck of the bottle before the plastic is applied. In this form of the invention the sleeve may be formed to its final shape as illustrated at the right of the figure and the ends may then be sprung apart to permit it to be slipped into place over the top and around the neck of the bottle, and to snap into closed position upon release of the ends. As illustrated in this figure, the upper end of the sleeve may be notched to provide a plurality of spaced tabs or projections 63, which may be bent over as illustrated at 64 before or after the sleeve is snapped into place. Except for these aspects the invention is practiced in the same way in the forms of each of Figures 7 and 10, Figure 8 and Figure 9.

Figures 11 and 13 illustrate the invention as applied to a slightly different form of bottle 70, which is of generally oblong shape but which tapers inwardly from opposite sides as illustrated at 71. The plastic sheathing 72, which is preferably an elastically expansible nonadherent coating as in the other embodiments, is perforated at 73 at points chosen as to number and spacing to provide rapid venting in case of any breakage of the enclosed glass bottle. It will be seen that only relatively sharp points will impact the floor or ground in case the bottle is dropped, unless one of the bottom edges strikes the surface along a line of some length. To prevent this it is only necessary to provide a plurality of localized projections 74 extending across these lines, in the same manner as projections 34 extend across the bottom ridges of the bottle of Figures 1–6.

Figures 12 and 14 illustrate application of the invention to a bottle 80 of circular cross-section which is tapered inwardly from both ends to a narrow waist 81 and coated at 82 and perforated at 83 as in the other embodiments. The protection required here is primarily against the possibility of falling directly on its bottom and involves a plurality of spaced projections 84 underlying the elastic coating.

While the invention has been described above primarily in relation to a few specific forms which it may take, persons skilled in the art will recognize that it is possible to apply, modify or refine it in various ways without departing from its basic concepts. We therefore wish it to be understood that this invention is not to be limited in interpretation except by the scope of the following claims.

We claim:

1. A container adapted to contain a product under pressure to be dispensed in aerosol form comprising a frangible bottle having a discharge opening, said bottle having at least one linearly projecting ridge, a continuous sheath of elastically expansible plastic material freely overlying substantially the entire exterior surface of the bottle and secured to said surface in sealing engagement therewith only adjacent said discharge opening, said bottle having a plurality of spaced localized external projections underlying said sheath along said ridge and extending from and beyond the line of said ridge, to produce substantially point impact location on said ridge, said sheath being elastically expansible by said pressure when released upon explosive fracture of the bottle, said sheath having tensile and tear strengths to withstand the initial explosive force and when expanded having tensile and tear strengths operable within the elastic limit of said sheath to confine and retain said pressure and the fracture fragments of the bottle, and said sheath having at least one vent therein operable upon expansion of said sheath to gradually exhaust said pressure therefrom while still retaining therein the fracture fragments of said bottle.

2. A container as claimed in claim 1, and including a dispensing valve structure clamped about the bottle adjacent the discharge opening thereof and secured in sealing relationship to the upper end of said sheath.

3. A container as claimed in claim 2, in which said sheath is mechanically interlocked with said valve structure through holes provided in a depending sleeve of said valve structure.

4. A container as claimed in claim 2 in which said sheath is adhesively secured to said valve structure.

5. A container as claimed in claim 1, and a ferrule surrounding said bottle adjacent the discharge opening thereof and secured to the upper end of said sheath and having its upper end flanged inwardly to overlie an edge portion of said discharge opening.

6. A container as claimed in claim 5, in which said ferrule is secured to said sheath by an adhesive bond.

7. A container as claimed in claim 5, in which said ferrule is provided with a plurality of holes and portions of the plastic sheath lie within these holes.

References Cited in the file of this patent

UNITED STATES PATENTS

| | | |
|---|---|---|
| D. 129,163 | Fuerst | Apr. 26, 1941 |
| 2,047,253 | Brooks | July 11, 1936 |
| 2,563,508 | Anschicks | Aug. 7, 1951 |
| 2,565,954 | Dey | Aug. 28, 1951 |
| 2,610,940 | Endicott | Sept. 16, 1952 |
| 2,756,105 | Magill | July 24, 1956 |

FOREIGN PATENTS

| | | |
|---|---|---|
| 345,758 | Great Britain | Apr. 2, 1951 |